(12) United States Patent
Li et al.

(10) Patent No.: US 11,940,353 B2
(45) Date of Patent: Mar. 26, 2024

(54) TEST DEVICE AND METHOD FOR AUTOMATIC PRESSURE REGULATING VALVE OF ELECTRONIC BRAKING SYSTEM

(71) Applicant: Wuhan University Of Technology, Wuhan (CN)

(72) Inventors: Gangyan Li, Wuhan (CN); Hanwei Bao, Wuhan (CN); Jian Hu, Wuhan (CN); Zhiqiang Gu, Wuhan (CN); Fang Yang, Wuhan (CN)

(73) Assignee: Wuhan University Of Technology, Wuhan (CN)

( * ) Notice: Subject to any disclaimer, the term of this patent is extended or adjusted under 35 U.S.C. 154(b) by 181 days.

(21) Appl. No.: 17/692,149

(22) Filed: Mar. 10, 2022

(65) Prior Publication Data

US 2022/0196513 A1    Jun. 23, 2022

Related U.S. Application Data

(63) Continuation of application No. PCT/CN2021/101823, filed on Jun. 23, 2021.

(30) Foreign Application Priority Data

Jun. 24, 2020  (CN) .......................... 202010588181.X

(51) Int. Cl.
  *G01M 3/28*      (2006.01)
(52) U.S. Cl.
  CPC ................................ *G01M 3/2876* (2013.01)

(58) Field of Classification Search
  CPC ...... G01M 3/2876; G01M 13/003; F17D 5/00
  See application file for complete search history.

(56) References Cited

U.S. PATENT DOCUMENTS

| | | |
|---|---|---|
| 6,817,234 B1 | 11/2004 | Maresko |
| 8,707,775 B2 | 4/2014 | Semones et al. |
| 8,870,299 B2 | 10/2014 | Wieder et al. |

FOREIGN PATENT DOCUMENTS

| | | |
|---|---|---|
| CN | 103162956 A | 6/2013 |
| CN | 103234718 A | 8/2013 |
| CN | 105181355 A | 12/2015 |
| CN | 106706234 A | 5/2017 |
| CN | 206656857 U | 11/2017 |
| CN | 109733364 A | 5/2019 |
| CN | 111766060 A | 10/2020 |

*Primary Examiner* — Alexander A Mercado
(74) *Attorney, Agent, or Firm* — True Shepherd LLC; Andrew C. Cheng

(57) ABSTRACT

A test device for an automatic pressure regulating valve of an electronic braking system includes a test device composed of an air supply, a pneumatic circuit, a valve, a sensor, a signal processing unit, and a control unit. By subjecting an automatic pressure regulating valve to a bench test including a functional test, a static performance test, a dynamic performance test, an air tightness test, a leakage test, and a brake chamber braking force test, the present disclosure avoids the high risk of a field test, improves the test efficiency, and ensures the test consistency. An automatic pressure regulating valve is tested before being loaded on a vehicle, and parameters of the automatic pressure regulating valve are continuously modified through tests to improve the performance, such that the automatic pressure regulating valve can meet the real-time, fast, independent, and accurate regulation requirements of EBS of commercial vehicles.

6 Claims, 5 Drawing Sheets

TEST DEVICE AND METHOD FOR AUTOMATIC PRESSURE REGULATING VALVE OF ELECTRONIC BRAKING SYSTEM

CROSS-REFERENCE TO RELATED APPLICATIONS

This application is a continuation of International Patent Application No. PCT/CN2021/101823 with a filing date of Jun. 23, 2021, designating the United States, now pending, and further claims priority to Chinese Patent Application No. 202010588181.X with a filing date of Jun. 24, 2020. The content of the aforementioned applications, including any intervening amendments thereto, are incorporated herein by reference.

TECHNICAL FIELD

The present disclosure belongs to the technical field of motor vehicle braking, and in particular relates to a test device and method for an automatic pressure regulating valve of an electronic braking system (EBS).

BACKGROUND ART

The safety, stability, and smoothness of commercial vehicles are the focus of the road transportation industry. An air brake system is a core module that determines the braking performance of commercial vehicles and is one of the most important devices to avoid traffic accidents. In recent years, EBS for commercial vehicles in and outside China has undergone great progress, and has been gradually equipped on commercial vehicles, which improves the braking performance and enhances the safety of commercial vehicles.

As a core component of EBS of a commercial vehicle, an automatic pressure regulating valve needs to meet the real-time, fast, independent, and accurate pressure regulation requirements, and also needs to meet the functional requirements of "fail-safe", thereby increasing the reliability of the system.

Chinese patent with an application number "201910082462.5" and a publication number "CN109733364A" discloses an automatic pressure regulating valve for a vehicle EBS and a control method thereof. The automatic pressure regulating valve includes an upper valve body, a lower valve body, a high-speed air-in valve, a high-speed air exhaust valve, and a one-way valve, where the lower valve body is connected to the upper valve body, and the high-speed air-in valve and the high-speed air exhaust valve are respectively arranged at two sides of the upper valve body; a control chamber is formed in the upper valve body, and a piston is provided in the control chamber; a high-speed air inlet B, a high-speed air exhaust port C, and a control air inlet A are also formed on the upper valve body; the high-speed air inlet B is connected to the control chamber through the high-speed air-in valve, the high-speed air exhaust port C is connected to the control chamber through the high-speed air exhaust valve, and the one-way valve is connected to the control air inlet A; an air-in chamber is formed in the lower valve body, a relay valve is provided in the air-in chamber, an air inlet D and an air outlet E are respectively formed at two sides of the relay valve, and an air-in chamber of the control chamber is connected to a control terminal of the relay valve. An automatic pressure regulating valve is configured to realize the functions of pressure boosting, pressure maintaining, and pressure reducing at an output, quickly and automatically regulate a pressure in an automobile brake chamber, reduce the transmission delay of an air brake system, and improve the safety of vehicle braking.

An automatic pressure regulating valve should be tested for tightness, pressure response characteristics, flow characteristics, durability, and the like before being loaded on a vehicle. If a field test is directly adopted, it is not only time-consuming and labor-intensive, but also has low efficiency and high risk. Therefore, it is urgent to develop a test device for an automatic pressure regulating valve to ensure that the function and performance of the automatic pressure regulating valve meet vehicle-loading requirements.

SUMMARY

The technical problem to be solved by the present disclosure is to provide a test device and method for an automatic pressure regulating valve of an EBS, which can test an automatic pressure regulating valve of an EBS with high efficiency and low risk.

To address the above problem, the present disclosure provides the following technical solution. A test device for an automatic pressure regulating valve of an electronic braking system (EBS) is provided, including an air supply, a pneumatic circuit, a valve, a sensor, a silencer, and a signal processing unit, where the air supply is configured to supply air to the pneumatic circuit; the pneumatic circuit includes a pneumatic trunk and an automatic pressure regulating valve test branch; an air inlet of the pneumatic trunk is connected to an air outlet of the air supply, which is intended to stabilize an air pressure, control an air supply, and regulate an air supply pressure; the automatic pressure regulating valve test branch includes a control air-in branch, a high-speed air-in branch, a high-speed air exhaust branch, an air-in branch, and an air-out branch; the control air-in branch, the high-speed air-in branch, and the high-speed air exhaust branch are configured to test the air tightness of a control chamber of the automatic pressure regulating valve to be tested, and the air-in branch and the air-out branch are configured to test the air tightness of an air-in chamber of the automatic pressure regulating valve to be tested; an air inlet of the control air-in branch is connected to an air outlet of the pneumatic trunk, and an air outlet of the control air-in branch is connected to a control air inlet A of the automatic pressure regulating valve to be tested; an air inlet of the high-speed air-in branch is connected to an air outlet of the pneumatic trunk, and an air outlet of the high-speed air-in branch is connected to a high-speed air inlet B of the automatic pressure regulating valve to be tested; an air inlet of the high-speed air exhaust branch is connected to a high-speed air exhaust port C of the automatic pressure regulating valve to be tested; an air inlet of the air-in branch is connected to an air outlet of the pneumatic trunk, and an air outlet of the air-in branch is connected to an air inlet D of the automatic pressure regulating valve to be tested; an air inlet of the air-out branch is connected to an air outlet E of the automatic pressure regulating valve to be tested; the valve includes a first electro/pneumatic proportional valve, a second electro/pneumatic proportional valve, a first shut-off valve, a second shut-off valve, a fifth shut-off valve, an eighth shut-off valve, and a high-speed air-in valve and a high-speed air exhaust valve of the automatic pressure regulating valve to be tested; the electro/pneumatic proportional valves are configured to simulate manually-intervened braking, and the shut-off valves are configured to simulate electronic pressure regulation; the first electro/pneumatic proportional valve is connected in series in the control air-in branch; the second electro/pneumatic proportional valve and the eighth shut-off valve are sequentially connected in series in the high-speed air-in branch; one side of the second shut-off valve is connected to an air outlet of the high-speed air exhaust branch, and the other side of the second shut-off valve is connected to the silencer configured to reduce an air exhaust sound; the first shut-off valve is connected in series in the air-in branch; one side of the fifth shut-off valve is connected to an air outlet of the air-out branch; the high-speed air-in valve and the high-speed air exhaust valve are respectively arranged at the high-speed air inlet B and the high-speed air exhaust port C of the automatic pressure regulating valve to be tested; the sensor includes a first pressure sensor and a second pressure sensor; the first pressure sensor is arranged in the air-in chamber of the automatic pressure regulating valve to be tested, and the first pressure sensor is configured to measure an air pressure in the air-in chamber; the second pressure sensor is arranged at the air outlet E of the automatic pressure regulating valve to be tested, and the second pressure sensor is configured to measure an air pressure at the air outlet E of the automatic pressure regulating valve to be tested; the signal processing unit includes a data acquisition circuit, a filter circuit, and a relay; a signal input terminal of the filter circuit is connected to a signal output terminal of the sensor, a signal output terminal of the filter circuit is connected to an analog-to-digital conversion interface of the data acquisition circuit, and the filter circuit is configured to smooth a signal input into the data acquisition circuit; a coil of the relay is connected to a digital-to-analog conversion interface of the data acquisition circuit, a contact of the relay is connected to a controlled terminal of the valve, and the relay is configured to regulate the open/close or a ventilation volume of the valve according to a received signal; a signal transmit-receive terminal of the data acquisition circuit is connected to a signal transmit-receive terminal of an upper computer, and the data acquisition circuit is configured to send sensor data to the upper computer and receive a control signal of the upper computer.

In the above technical solution, the pneumatic trunk includes a pneumatic FRL (a filter (F), a regulator (R), and a lubricator (L)) unit, an air storage tank, an on-off valve, and a precision pressure reducing valve that are sequentially connected in series; the pneumatic FRL unit is configured to filter out residues and moisture in air; the air storage tank is configured to store air and stabilize an air pressure during a test; the on-off valve is a main air supply switch of the test device; and the precision pressure reducing valve is configured to control an air supply pressure of the pneumatic circuit.

In the above technical solution, a flow test circuit is also provided, and the flow test circuit includes a high-speed air inlet flow test circuit and an air inlet flow test circuit; the high-speed air inlet flow test circuit is connected in parallel at two sides of the eighth shut-off valve, and is configured to measure a flow rate of the high-speed air inlet B of the automatic pressure regulating valve to be tested; the air inlet flow test circuit is connected in parallel at two sides of the first shut-off valve, and is configured to measure a flow rate of the air inlet D of the automatic pressure regulating valve to be tested; the valve further includes a third shut-off valve, a fourth shut-off valve, a sixth shut-off valve, and a seventh shut-off valve, and the sensor further includes a first flow sensor and a second flow sensor; the sixth shut-off valve, the second flow sensor, and the seventh shut-off valve are sequentially connected in series in the high-speed air inlet flow test circuit; and the third shut-off valve, the first flow sensor, and the fourth shut-off valve are sequentially connected in series in the air inlet flow test circuit.

In the above technical solution, the test device further includes a brake chamber; the sensor further includes a force sensor and a third pressure sensor; the other side of the fifth shut-off valve is connected in series with the brake chamber and the third pressure sensor sequentially, and the force sensor is arranged on the brake chamber; and the third pressure sensor is configured to measure an air pressure in the brake chamber, and the force sensor is configured to measure a push rod force during an inflation process of the brake chamber.

In the above technical solution, the test device further includes a control unit, an input unit, and an output unit; a signal transmit-receive terminal of the control unit is connected to a signal transmit-receive terminal of the signal processing unit, and the control unit is configured to receive and process sensor data and send a valve control signal; a signal output terminal of the input unit is connected to a signal input terminal of the control unit, and the input unit is configured to convert a user operation into a control signal and send the control signal to the control unit; and a signal output terminal of the control unit is connected to a signal input terminal of the output unit, and the output unit is configured to display data output by the control unit to a user.

In the above technical solution, the test device further includes a test bench, and the test bench includes a special bracket, an insulating operating desk, and a frame; the special bracket includes an on-off valve bracket, a shut-off valve bracket, an electro/pneumatic proportional valve bracket, a brake chamber bracket, and a force sensor bracket, which are respectively configured to fix the on-off valve, the shut-off valve, the electro/pneumatic proportional valve, the brake chamber, and the force sensor on the insulating operating desk through fasteners, such that the pneumatic circuit is on the same plane and the smoothness of the pneumatic circuit is increased; the insulating operating desk includes an insulating pad and a bench panel; the insulating pad is laid between the special bracket and the bench panel for insulation to ensure the electrical safety during a test process; the bench panel is configured to fix the special bracket and the automatic pressure regulating valve to be tested in the same plane; and the frame includes profiles connected through triangle connectors and is configured to support the insulating operating desk.

A test method based on the test device for an automatic pressure regulating valve of an EBS is provided, including the following steps:

S1: assembly of the test device: connecting the profiles through the triangle connectors to form the frame and arranging the frame under the bench panel for supporting; laying the insulating pad on the bench panel to form the insulating operating desk; fixing the on-off valve, the shut-off valve, the electro/pneumatic proportional valve, the brake chamber, the force sensor, and the automatic pressure regulating valve to be tested on the insulating operating desk through the fasteners and the special brackets; sequentially connecting the pneumatic FRL unit, the air storage tank, the on-off valve, and the precision pressure reducing valve in series to form the pneumatic trunk; connecting the air inlet of the pneumatic trunk to the air outlet of the air supply, connecting the air inlet of the control air-in branch to the air outlet of the pneumatic trunk, connecting the air outlet of the control air-in branch to the control air inlet A of the automatic pressure regulating valve to be tested, and connecting the first electro/pneumatic proportional valve in series in the control air-in branch; connecting the air inlet of the high-speed air-in branch to the air outlet of the pneumatic trunk, connecting the air outlet of the high-speed air-in branch to the high-speed air inlet B of the automatic pressure regulating valve to be tested, and sequentially connecting the second electro/pneumatic proportional valve and the eighth shut-off valve in series in the high-speed air-in branch; connecting the air inlet of the high-speed air exhaust branch to the high-speed air exhaust port C of the automatic pressure regulating valve to be tested, connecting the air outlet of the high-speed air exhaust branch to one side of the second shut-off valve, and connecting the other side of the second shut-off valve to the silencer; connecting the air inlet of the air-in branch to the air outlet of the pneumatic trunk, connecting the air outlet of the air-in branch to the air inlet D of the automatic pressure regulating valve to be tested, and connecting the first shut-off valve in series in the air-in branch; connecting the air inlet of the air-out branch to the air outlet E of the automatic pressure regulating valve to be tested, connecting the air outlet of the air-out branch to one side of the fifth shut-off valve, sequentially connecting the brake chamber and the third pressure sensor in series to the other side of the fifth shut-off valve, and arranging the force sensor on the brake chamber; arranging the first pressure sensor in the air-in chamber of the automatic pressure regulating valve to be tested; arranging the second pressure sensor at the air outlet E of the automatic pressure regulating valve to be tested; sequentially connecting the sixth shut-off valve, the second flow sensor, and the seventh shut-off valve in series in the high-speed air inlet flow test circuit, and connecting the high-speed air inlet flow test circuit in parallel at two sides of the eighth shut-off valve; sequentially connecting the third shut-off valve, the first flow sensor, and the fourth shut-off valve in series in the air inlet flow test circuit, and connecting the air inlet flow test circuit in parallel at two sides of the first shut-off valve; connecting the signal input terminal of the filter circuit to the signal output terminal of each of the first pressure sensor, the second pressure sensor, the third pressure sensor, the first flow sensor, the second flow sensor, and the force sensor, and connecting the signal output terminal of the filter circuit to the analog-to-digital conversion interface of the data acquisition circuit; connecting the coil of the relay to the digital-to-analog conversion interface of the data acquisition circuit, and connecting the contact of the relay to the controlled terminal of each of the first electro/pneumatic proportional valve, the second electro/pneumatic proportional valve, the first shut-off valve, the second shut-off valve, the third shut-off valve, the fourth shut-off valve, the fifth shut-off valve, the sixth shut-off valve, the seventh shut-off valve, the eighth shut-off valve, and the high-speed air-in valve and the high-speed air exhaust valve of the automatic pressure regulating valve to be tested; connecting the signal transmit-receive terminal of the data acquisition circuit to the signal transmit-receive terminal of the control unit; connecting the signal output terminal of the input unit to the signal input terminal of the control unit; connecting the signal output terminal of the control unit to the signal input terminal of the output unit;

S2: draining condensated water everywhere, closing all shut-off valves to make an output pressure everywhere in the test device zero, and closing a throttle valve of the lubricator; and subjecting the test device to a trial run;

S3: starting the test device, and inputting control parameters into the control unit through the input unit, such that the control unit sends the control parameters to each component of the pneumatic circuit through the signal processing unit; and S4: allowing each component of the pneumatic circuit to run according to the received control parameters, such that the automatic pressure regulating valve to be tested is subjected to a functional test, a static performance test, a dynamic performance test, an air tightness test, a leakage test, and a brake chamber braking force test sequentially.

Further, step S4 specifically includes:

S41: the functional test: supplying air by the air supply to the pneumatic circuit, filtering the air through the pneumatic FRL unit to obtain clean compressed air, regulating an air supply pressure by the precision pressure reducing valve, opening all shut-off valves, and conducting an electronic failed brake test, an electronic brake test, and a coupled brake test sequentially;

S42: the static performance test: setting a target pressure by the control unit, testing according to step S41, and acquiring a pressure value of the first pressure sensor to verify whether an outlet pressure of the automatic pressure regulating valve to be tested is consistent with the target pressure;

S43: the dynamic performance test: continuously changing the target pressure by the control unit, testing according to step S41, and acquiring a pressure value of the first pressure sensor to verify whether a dynamic pressure regulating capability and a response speed of the automatic pressure regulating valve to be tested meet requirements;

S44: the air tightness test: supplying air by the air supply to the pneumatic circuit, filtering the air through the pneumatic FRL unit to obtain clean compressed air, and regulating an air supply pressure by the precision pressure reducing valve; opening the first shut-off valve, and supplying air to the automatic pressure regulating valve to be tested; after a target pressure is reached, stabilizing the pressure for 1 min and closing the control air inlet A, the high-speed air inlet B, the high-speed air exhaust port C, the air inlet D, and the air outlet E of the automatic pressure regulating valve to be tested; and recording a pressure drop between the air outlet E of the automatic pressure regulating valve to be tested and the control chamber within 5 min to verify whether the automatic pressure regulating valve to be tested meets air tightness requirements;

S45: the leakage test: subjecting the control chamber and the air-in chamber of the automatic pressure regulating valve to be tested to the leakage test sequentially; and S46: the brake chamber braking force test: testing according to step S41, acquiring a force signal of the force sensor, and calculating and analyzing braking force change data of the automatic pressure regulating valve to be tested during a pressure regulating process by a braking force calculation model of the control unit.

Further, step S41 specifically includes:

S411: the electronic failed brake test: sending a control signal by the control unit only to the first electro/pneumatic proportional valve, such that the first electro/pneumatic proportional valve simulates a pedal valve to regulate an outlet pressure of the automatic pressure regulating valve to be tested; and ventilating the control air inlet A of the automatic pressure regulating valve to be tested, and acquiring pressure values of the first pressure sensor, the second pressure sensor, and the third pressure sensor by the control unit;

S412: the electronic brake test: sending a control signal only to the second electro/pneumatic proportional valve by the control unit, and ventilating the high-speed air inlet B of the automatic pressure regulating valve to be tested; and regulating an outlet pressure of the automatic pressure regulating valve to be tested by the high-speed air-in valve and the high-speed air exhaust valve of the automatic pressure regulating valve to be tested according to the control signal sent by the control unit, and acquiring pressure values of the first pressure sensor, the second pressure sensor, and the third pressure sensor by the control unit; and S413: the coupled brake test: sending a control signal to both the first electro/pneumatic proportional valve and the second electro/pneumatic proportional valve by the control unit, such that the first electro/pneumatic proportional valve simulates a pedal valve to ventilate the control air inlet A and the high-speed air inlet B of the automatic pressure regulating valve to be tested; and regulating an outlet pressure of the automatic pressure regulating valve to be tested by the high-speed air-in valve and the high-speed air exhaust valve of the automatic pressure regulating valve to be tested according to the control signal sent by the control unit, and acquiring pressure values of the first pressure sensor, the second pressure sensor, and the third pressure sensor by the control unit to verify whether the automatic pressure regulating valve to be tested realizes a pressure regulating function.

Further, step S45 specifically includes:

S451: the leakage test of the control chamber: supplying air by the air supply to the pneumatic circuit, filtering the air through the pneumatic FRL unit to obtain clean compressed air, regulating an air supply pressure by the precision pressure reducing valve, and opening all shut-off valves; supplying air to the automatic pressure regulating valve to be tested, and after a target pressure is reached and the pressure is stable, closing the second shut-off valve and the eighth shut-off valve, such that the control chamber of the automatic pressure regulating valve to be tested is in a closed state but can continue to supply air; and acquiring a flow signal of the second flow sensor, which is a leakage of the control chamber of the automatic pressure regulating valve to be tested; and S452: the leakage test of the air-in chamber: supplying air by the air supply to the pneumatic circuit, filtering the air through the pneumatic FRL unit to obtain clean compressed air, regulating an air supply pressure by the precision pressure reducing valve, and opening all shut-off valves; supplying air to the automatic pressure regulating valve to be tested, and after a target pressure is reached and the pressure is stable, closing the first shut-off valve and the fifth shut-off valve, such that a lower chamber of the automatic pressure regulating valve to be tested is in a closed state but can continue to supply air; and acquiring a flow signal of the first flow sensor, which is a leakage of the air-in chamber of the automatic pressure regulating valve to be tested.

The present disclosure has the following beneficial effects:

1. The test device and method for an automatic pressure regulating valve of an EBS of the present disclosure avoids the high risk of a field test, improves the test efficiency, and ensures the test consistency by subjecting the automatic pressure regulating valve to a bench test.

2. In the present disclosure, an automatic pressure regulating valve is tested before being loaded on a vehicle, and parameters of the automatic pressure regulating valve are continuously modified through tests to improve the performance, such that the automatic pressure regulating valve can meet the real-time, fast, independent, and accurate regulation requirements of EBS of commercial vehicles, thereby shortening the braking response time of EBS of commercial vehicles and improving the reliability thereof.

3. In the present disclosure, various performance index data of an automatic pressure regulating valve are acquired and displayed in real time, which is easy to operate; and the entire test process has a high degree of automation, which satisfies the function and performance test requirements of automatic pressure regulating valves of EBS of commercial vehicles and promotes the development of EBS technology of commercial vehicles.

In the figures: 1 represents an air supply; 2 represents a pneumatic FRL unit; 3 represents an air storage tank; 4 represents an on-off valve; 5 represents a precision pressure reducing valve; 6 represents a first electro/pneumatic proportional valve; 7 represents a second electro/pneumatic proportional valve; 8 represents an automatic pressure regulating valve to be tested; 9 represents a first shut-off valve; 10 represents a second shut-off valve; 11 represents a third shut-off valve; 12 represents a first flow sensor; 13 represents a fourth shut-off valve; 14 represents a silencer; 15 represents a first pressure sensor; 16 represents a second pressure sensor; 17 represents a fifth shut-off valve; 18 represents a sixth shut-off valve; 19 represents a second flow sensor; 20 represents a seventh shut-off valve; 21 represents a brake chamber; 22 represents a third pressure sensor; 23 represents a force sensor; 24 represents an NI acquisition card; 25 represents an industrial computer; and 26 represents an eighth shut-off valve.

DETAILED DESCRIPTION OF THE EMBODIMENTS

The present disclosure is further described in detail below with reference to the accompanying drawings and specific embodiments.

Figure 1:
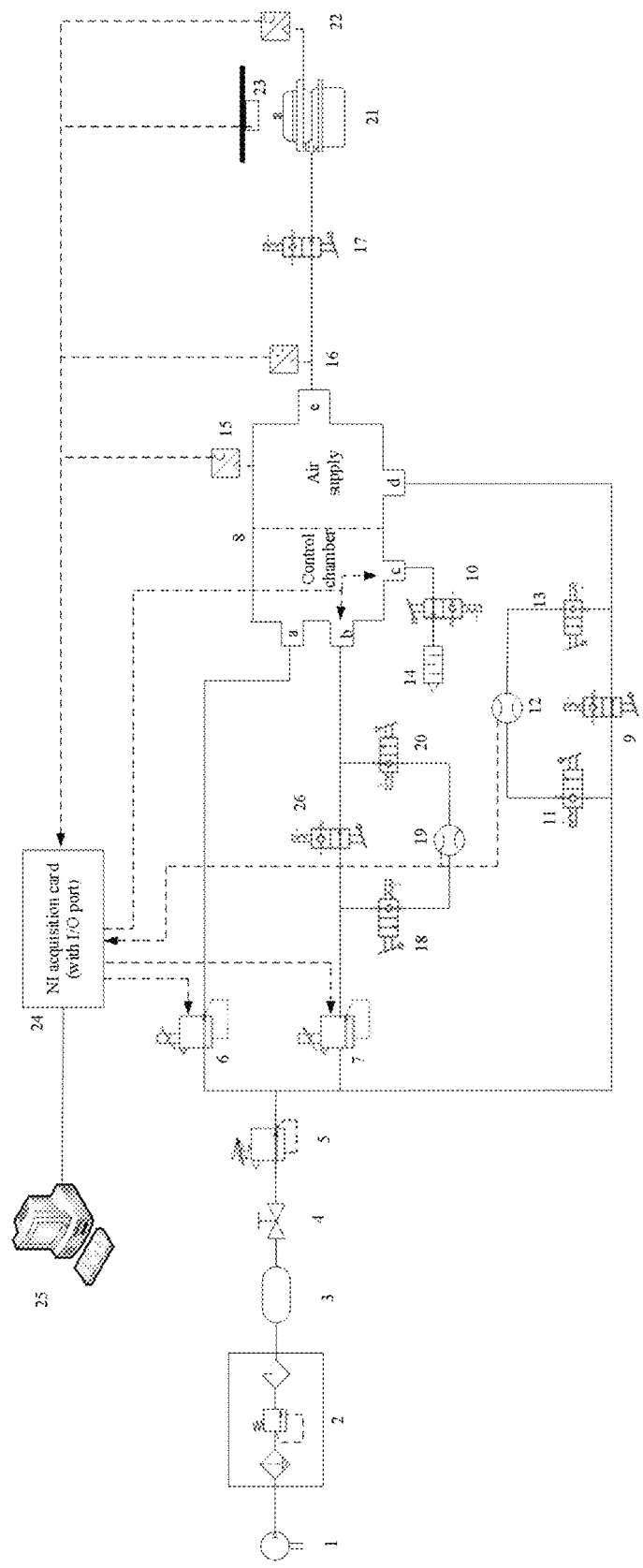
FIG. 1 is a functional block diagram of an embodiment of the present disclosure.

As shown in FIG. 1, a test device for an automatic pressure regulating valve of an EBS according to an embodiment of the present disclosure includes a test bench, an air supply 1, a pneumatic circuit, a brake chamber 21, a valve, a sensor, a silencer 14, a signal processing unit, and an industrial computer 25.

Figure 3:
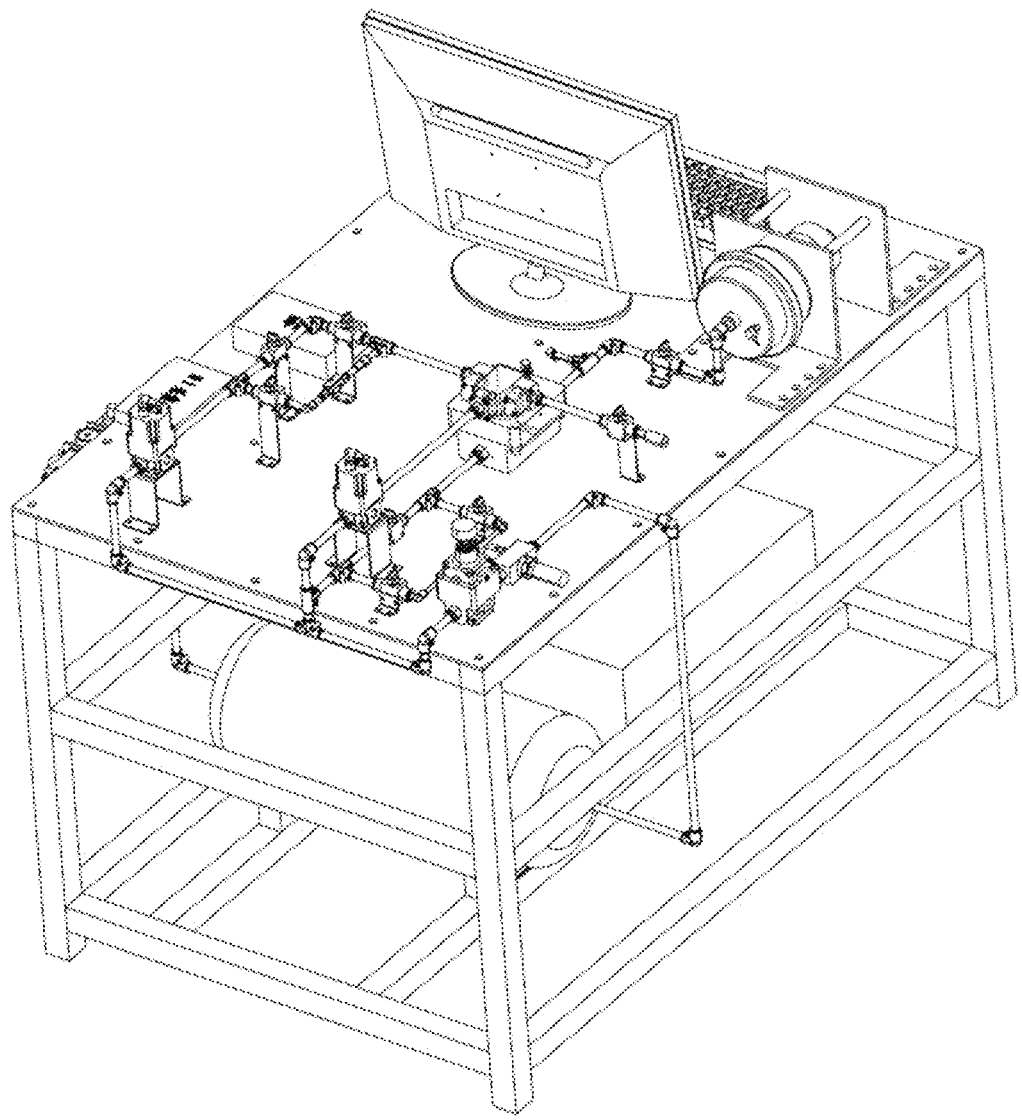
FIG. 3 is a perspective view of an embodiment of the present disclosure.
Figure 4:
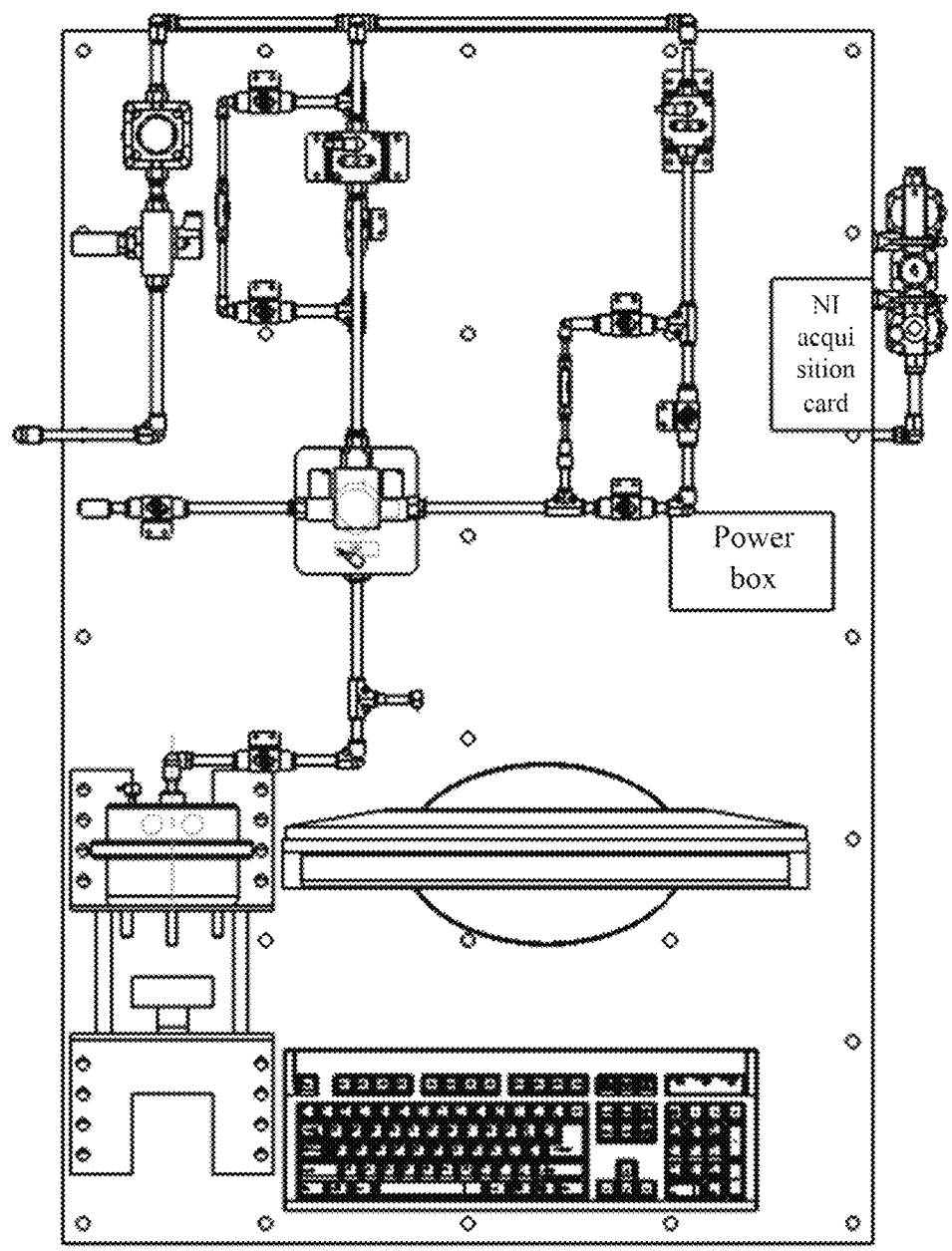
FIG. 4 is a top view of an embodiment of the present disclosure.
Figure 5:
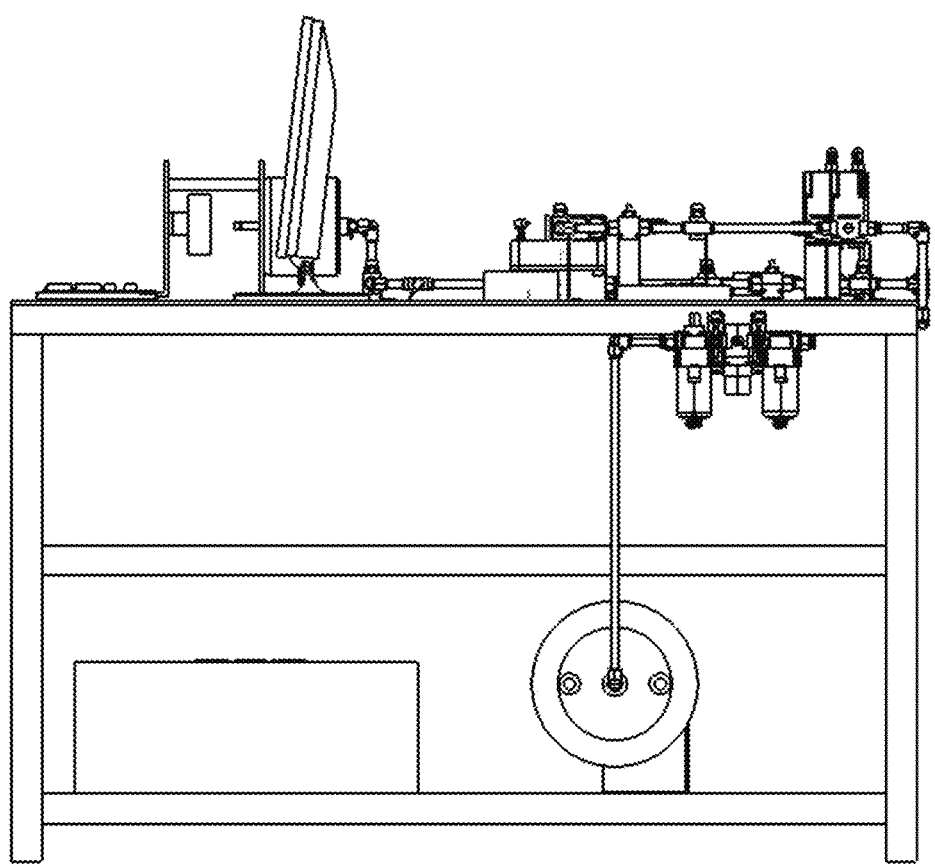
FIG. 5 is a left side view of an embodiment of the present disclosure.

As shown in FIG. 3 to FIG. 5, the test bench includes a special bracket, an insulating operating desk, and a frame; the special bracket is made of 304 stainless steel, including an on-off valve bracket, a shut-off valve bracket, an electro/pneumatic proportional valve bracket, a brake chamber bracket, and a force sensor bracket, which are respectively configured to fix an on-off valve 4, a shut-off valve, an electro/pneumatic proportional valve, a brake chamber 21, and a force sensor 23 on an insulating operating desk through bolts, such that the pneumatic circuit is in the same plane and the smoothness of the pneumatic circuit is increased; the insulating operating desk includes an insulating rubber pad and a bench panel, the bench panel is made of 304 stainless steel, and the insulating rubber pad is laid between the special bracket and the bench panel for insulation to ensure the electrical safety during a test process; the bench panel is configured to fix the special bracket and an automatic pressure regulating valve 8 to be tested in the same plane; and the frame includes aluminum alloy profiles connected through triangle connectors and is configured to support the insulating operating desk. The test bench makes the test device beautiful and clear, makes pipelines smooth, and makes test results reliable.

The air supply 1 is configured to supply air to the pneumatic circuit, with an air pressure of about 1 MPa; and the pneumatic circuit includes a pneumatic trunk and an automatic pressure regulating valve test branch, and the trunk and branch of the pneumatic circuit are connected through a polyamide (PA) pipe, an elbow, a tee, or the like.

An air inlet of the pneumatic trunk is connected to an air outlet of the air supply 1, which is intended to stabilize an air pressure, control an air supply, and regulate an air supply pressure; the pneumatic trunk includes a pneumatic FRL (a filter (F), a regulator (R), and a lubricator (L)) unit 2, an air storage tank 3, an on-off valve 4, and a precision pressure reducing valve 5 that are sequentially connected in series; the pneumatic FRL unit 2 is configured to filter out residues and moisture in air; the air storage tank 3 is configured to store air and stabilize an air pressure during a test; the on-off valve 4 is a main air supply switch of the test device; and the precision pressure reducing valve 5 is configured to control an air supply pressure of the pneumatic circuit.

The automatic pressure regulating valve test branch includes a control air-in branch, a high-speed air-in branch, a high-speed air exhaust branch, an air-in branch, an air-out branch, and a flow test circuit; and the control air-in branch, the high-speed air-in branch, and the high-speed air exhaust branch are configured to test the air tightness of the control chamber of the automatic pressure regulating valve 8 to be tested, and the air-in branch and the air-out branch are configured to test the air tightness of the air-in chamber of the automatic pressure regulating valve 8 to be tested.

The valve includes a first electro/pneumatic proportional valve 6, a second electro/pneumatic proportional valve 7, a first shut-off valve 9, a second shut-off valve 10, a third shut-off valve 11, a fourth shut-off valve 13, a fifth shut-off valve 17, a sixth shut-off valve 18, a seventh shut-off valve 20, an eighth shut-off valve 26, and a high-speed air-in valve and a high-speed air exhaust valve of the automatic pressure regulating valve 8 to be tested; and the electro/pneumatic proportional valves are configured to simulate manually-intervened braking, and the shut-off valves are configured to simulate electronic pressure regulation.

The sensor includes a first pressure sensor 15, a second pressure sensor 16, a third pressure sensor 22, a force sensor 23, a first flow sensor 12, and a second flow sensor 19.

An air inlet of the control air-in branch is connected to an air outlet of the pneumatic trunk, an air outlet of the control air-in branch is connected to a control air inlet A of the automatic pressure regulating valve 8 to be tested, and the first electro/pneumatic proportional valve 6 is connected in series in the control air-in branch.

An air inlet of the high-speed air-in branch is connected to an air outlet of the pneumatic trunk, an air outlet of the high-speed air-in branch is connected to a high-speed air inlet B of the automatic pressure regulating valve 8 to be tested, and the second electro/pneumatic proportional valve 7 and the eighth shut-off valve 26 is sequentially connected in series in the high-speed air-in branch.

An air inlet of the high-speed air exhaust branch is connected to a high-speed air exhaust port C of the automatic pressure regulating valve 8 to be tested, one side of the second shut-off valve 10 is connected to an air outlet of the high-speed air exhaust branch, and the other side of the second shut-off valve 10 is connected to the silencer 14 configured to reduce an air exhaust sound.

An air inlet of the air-in branch is connected to an air outlet of the pneumatic trunk, an air outlet of the air-in branch is connected to an air inlet D of the automatic pressure regulating valve 8 to be tested, and the first shut-off valve 9 is connected in series in the air-in branch.

An air inlet of the air-out branch is connected to an air outlet E of the automatic pressure regulating valve 8 to be tested; one side of the fifth shut-off valve 17 is connected to an air outlet of the air-out branch, and the other side of the fifth shut-off valve 17 is connected in series to the brake chamber 21 and the third pressure sensor 22 sequentially; the force sensor 23 is arranged on the brake chamber 21; the third pressure sensor 22 is configured to measure an air pressure in the brake chamber; the force sensor 23 is configured to measure a push rod force during an inflation process of the brake chamber 21 and send the push rod force to a host of the industrial computer 25; and the host estimates a braking force value generated by the brake chamber 21 during a test process through a braking force estimation method.

In the automatic pressure regulating valve 8 to be tested, the high-speed air-in valve and the high-speed air exhaust valve are respectively arranged at the high-speed air inlet B and the high-speed air exhaust port C; the first pressure sensor 15 is arranged in the air-in chamber of the automatic pressure regulating valve 8 to be tested, and the first pressure sensor 15 is configured to measure an air pressure in the air-in chamber; the second pressure sensor 16 is arranged at the air outlet E of the automatic pressure regulating valve 8 to be tested, and the second pressure sensor 16 is configured to measure an air pressure at the air outlet E of the automatic pressure regulating valve 8 to be tested.

The flow test circuit includes a high-speed air inlet flow test circuit and an air inlet flow test circuit; the high-speed air inlet flow test circuit is connected in parallel at two sides of the eighth shut-off valve 26 to measure a flow rate of the high-speed air inlet B of the automatic pressure regulating valve 8 to be tested; the air inlet flow test circuit is connected in parallel at two sides of the first shut-off valve 9 to measure a flow rate of the air inlet D of the automatic pressure regulating valve 8 to be tested; the sixth shut-off valve 18, the second flow sensor 19, and the seventh shut-off valve 20 are connected in series in the high-speed air inlet flow test circuit; and the third shut-off valve 11, the first flow sensor 12, and the fourth shut-off valve 13 are connected in series in the air inlet flow test circuit.

Figure 2:
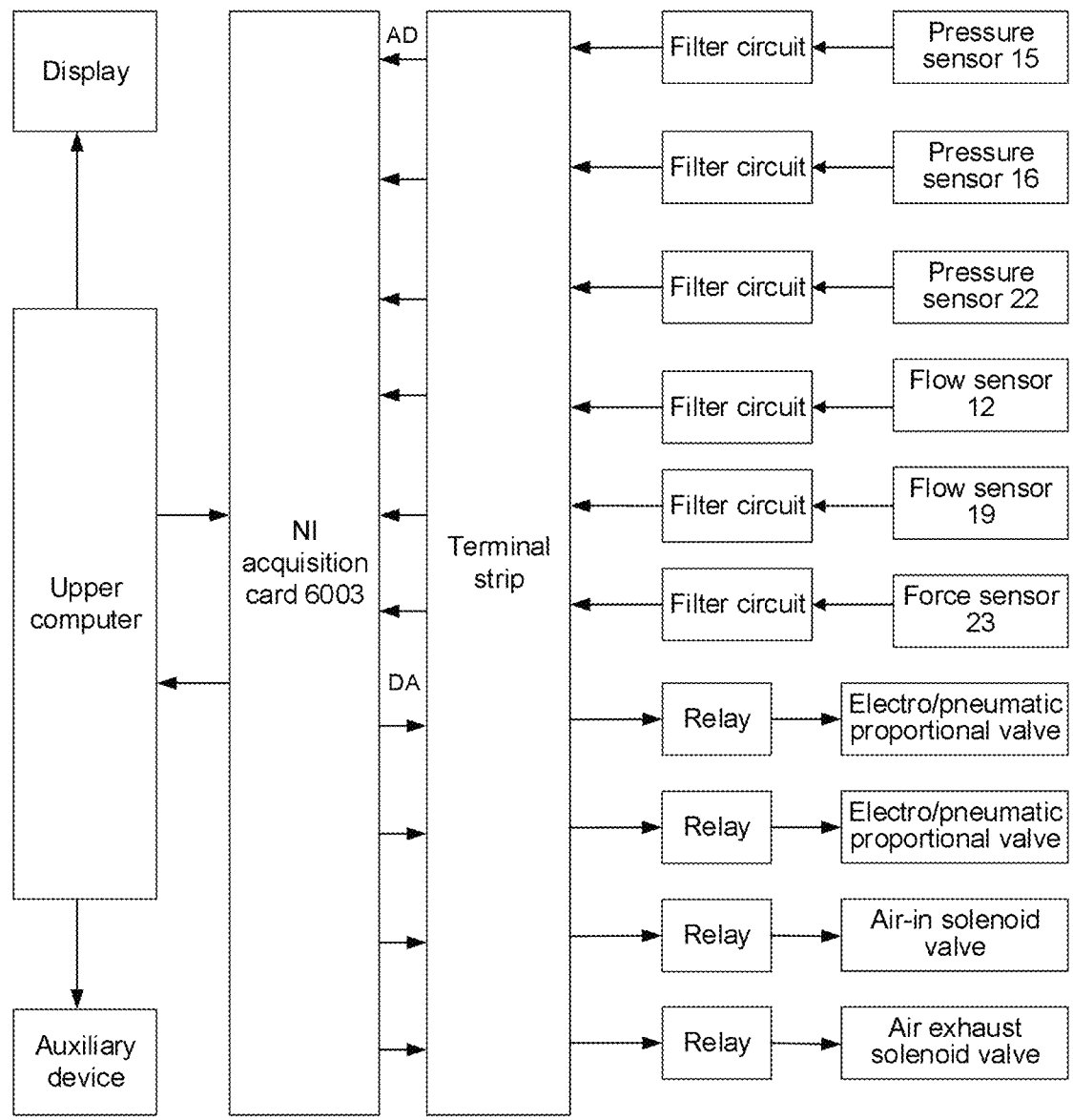
FIG. 2 is an electrical connection diagram of an embodiment of the present disclosure.

As shown in FIG. 2, the signal processing unit includes an NI acquisition card 24, a filter circuit, and a relay; a signal input terminal of the filter circuit is connected to a signal output terminal of the sensor, a signal output terminal of the filter circuit is connected to an analog-to-digital conversion interface of the NI acquisition card 24 through a wiring terminal, and the filter circuit is configured to smooth a signal input into the NI acquisition card 24; a coil of the relay is connected to a digital-to-analog conversion interface of the NI acquisition card 24 through a wiring terminal, a contact of the relay is connected to a controlled terminal of the valve, and the relay is configured to regulate the open/close or a ventilation volume of the valve according to a received signal; and a signal transmit-receive terminal of the NI acquisition card 24 is connected to a signal transmit-receive terminal of a host of the industrial computer 25, and the NI acquisition card 24 is configured to send sensor data to the host and receive a control signal of the host.

The industrial computer 25 includes a host, a display, a speaker, a keyboard, and a mouse; the host is configured to receive and process sensor data and send a valve control signal; signal output terminals of the keyboard and the mouse are connected to a signal input terminal of the host, and the keyboard and the mouse are configured to convert a user operation into a control signal and send the control signal to the host; a signal output terminal of the host is connected to signal input terminals of the display and the speaker, and the display and the speaker are configured to display or sound data output by the host to a user.

A test method based on the test device for an automatic pressure regulating valve of an EBS includes the following steps:

S1: assembly of the test device profiles are connected through triangle connectors to form the frame, and the frame is arranged under a bench panel for supporting;

an insulating pad is laid on the bench panel to form the insulating operating desk;

fixing the on-off valve 4, the shut-off valve, the electro/pneumatic proportional valve, the brake chamber 21, the force sensor 23, and the automatic pressure regulating valve 8 to be tested on the insulating operating desk through bolts and special brackets;

the pneumatic FRL unit 2, the air storage tank 3, the on-off valve 4, and the precision pressure reducing valve 5 are sequentially connected in series to form the pneumatic trunk;

the air inlet of the pneumatic trunk is connected to the air outlet of the air supply 1, the air inlet of the control air-in branch is connected to the air outlet of the pneumatic trunk, the air outlet of the control air-in branch is connected to the control air inlet A of the automatic pressure regulating valve 8 to be tested, and the first electro/pneumatic proportional valve 6 is connected in series in the control air-in branch;

the air inlet of the high-speed air-in branch is connected to the air outlet of the pneumatic trunk, the air outlet of the high-speed air-in branch is connected to the high-speed air inlet B of the automatic pressure regulating valve 8 to be tested, and the second electro/pneumatic proportional valve 7 and the eighth shut-off valve 26 are sequentially connected in series in the high-speed air-in branch;

the air inlet of the high-speed air exhaust branch is connected to the high-speed air exhaust port C of the automatic pressure regulating valve 8 to be tested, the air outlet of the high-speed air exhaust branch is connected to one side of the second shut-off valve 10, and the other side of the second shut-off valve 10 is connected to the silencer 14;

the air inlet of the air-in branch is connected to the air outlet of the pneumatic trunk, the air outlet of the air-in branch is connected to the air inlet D of the automatic pressure regulating valve 8 to be tested, and the first shut-off valve 9 is connected in series in the air-in branch;

the air inlet of the air-out branch is connected to the air outlet E of the automatic pressure regulating valve 8 to be tested, the air outlet of the air-out branch is connected to one side of the fifth shut-off valve 17, the brake chamber 21 and the third pressure sensor 22 are sequentially connected in series to the other side of the fifth shut-off valve 17, and the force sensor 23 is arranged on the brake chamber 21;

the first pressure sensor 15 is arranged in the air-in chamber of the automatic pressure regulating valve 8 to be tested;

the second pressure sensor 16 is arranged at the air outlet E of the automatic pressure regulating valve 8 to be tested;

the sixth shut-off valve 18, the second flow sensor 19, and the seventh shut-off valve 20 are sequentially connected in series in the high-speed air inlet flow test circuit, and the high-speed air inlet flow test circuit is connected in parallel at two sides of the eighth shut-off valve 26;

the third shut-off valve 11, the first flow sensor 12, and the fourth shut-off valve 13 are sequentially connected in series in the air inlet flow test circuit, and the air inlet flow test circuit is connected in parallel at two sides of the first shut-off valve 9;

the signal input terminal of the filter circuit is connected to the signal output terminal of each of the first pressure sensor 15, the second pressure sensor 16, the third pressure sensor 22, the first flow sensor 12, the second flow sensor 19, and the force sensor 23, and the signal output terminal of the filter circuit is connected to the analog-to-digital conversion interface of the NI acquisition card 24 through a wiring terminal;

the coil of the relay is connected to the digital-to-analog conversion interface of the NI acquisition card 24 through a wiring terminal;

the contact of the relay is connected to the controlled terminal of each of the first electro/pneumatic proportional valve 6, the second electro/pneumatic proportional valve 7, the first shut-off valve 9, the second shut-off valve 10, the third shut-off valve 11, the fourth shut-off valve 13, the fifth shut-off valve 17, the sixth shut-off valve 18, the seventh shut-off valve 20, the eighth shut-off valve 26, and the high-speed air-in valve and the high-speed air exhaust valve of the automatic pressure regulating valve 8 to be tested;

the signal transmit-receive terminal of the NI acquisition card 24 is connected to the signal transmit-receive terminal of the host;

signal output terminals of the keyboard and the mouse are connected to the signal input terminal of the host;

the signal output terminal of the host is connected to signal input terminals of the display and the speaker;

S2: condensated water everywhere is drained, all shut-off valves are closed to make an output pressure everywhere in the test device zero, and a throttle valve of the lubricator is closed; and the test device is subjected to a trial run;

S3: the test device is started, and control parameters are input into the host through the keyboard and the mouse, such that the host sends the control parameters to each component of the pneumatic circuit through the NI acquisition card 24;

S4: each component of the pneumatic circuit is allowed to run according to the received control parameters, such that the automatic pressure regulating valve 8 to be tested is subjected to a functional test, a static performance test, a dynamic performance test, an air tightness test, a leakage test, and a brake chamber braking force test sequentially:

S41: the functional test: air is supplied by the air supply 1 to the pneumatic circuit, and then filtered through the pneumatic FRL unit 2 to obtain clean compressed air, an air supply pressure is regulated by the precision pressure reducing valve 5, all shut-off valves are opened, and an electronic failed brake (conventional brake) test, an electronic brake test, and a coupled brake test are conducted sequentially;

S411: the electronic failed brake (conventional brake) test: a control signal is sent by the host only to the first electro/pneumatic proportional valve 6, such that the first electro/pneumatic proportional valve 6 simulates a pedal valve to regulate an outlet pressure of the automatic pressure regulating valve 8 to be tested; and the control air inlet A of the automatic pressure regulating valve 8 to be tested is ventilated, and pressure values of the first pressure sensor 15, the second pressure sensor 16, and the third pressure sensor 22 are acquired by the host;

S412: the electronic brake test: a control signal is sent only to the second electro/pneumatic proportional valve 7 by the host, and the high-speed air inlet B of the automatic pressure regulating valve 8 to be tested is ventilated; and an outlet pressure of the automatic pressure regulating valve 8 to be tested is regulated by the high-speed air-in valve and the high-speed air exhaust valve of the automatic pressure regulating valve 8 to be tested according to the control signal sent by the host, and pressure values of the first pressure sensor 15, the second pressure sensor 16, and the third pressure sensor 22 are acquired by the host; and S413: the coupled brake test: a control signal is sent to both the first electro/pneumatic proportional valve 6 and the second electro/pneumatic proportional valve 7 by the host, such that the first electro/pneumatic proportional valve 6 simulates a pedal valve to ventilate the control air inlet A and the high-speed air inlet B of the automatic pressure regulating valve 8 to be tested; and an outlet pressure of the automatic pressure regulating valve 8 to be tested is regulated by the high-speed air-in valve and the high-speed air exhaust valve of the automatic pressure regulating valve 8 to be tested according to the control signal sent by the host, and pressure values of the first pressure sensor 15, the second pressure sensor 16, and the third pressure sensor 22 are acquired by the host to verify whether the automatic pressure regulating valve 8 to be tested realizes a pressure regulating function;

S42: the static performance test: a target pressure is set by the host, a test is conducted according to step S41, and a pressure value of the first pressure sensor 15 is acquired to verify whether an outlet pressure of the automatic pressure regulating valve 8 to be tested is consistent with the target pressure;

S43: the dynamic performance test: the target pressure is continuously changed by the host, a test is conducted according to step S41, and a pressure value of the first pressure sensor 15 is acquired to verify whether a dynamic pressure regulating capability and a response speed of the automatic pressure regulating valve 8 to be tested meet requirements;

S44: the air tightness test: air is supplied by the air supply 1 to the pneumatic circuit, and then filtered through the pneumatic FRL unit 2 to obtain clean compressed air, and an air supply pressure is regulated by the precision pressure reducing valve 5; the first shut-off valve 9 is opened, and air is supplied to the automatic pressure regulating valve 8 to be tested; after a target pressure is reached, the pressure is stabilized for 1 min and the control air inlet A, the high-speed air inlet B, the high-speed air exhaust port C, the air inlet D, and the air outlet E of the automatic pressure regulating valve 8 to be tested are closed; and a pressure drop between the air outlet E of the automatic pressure regulating valve 8 to be tested and the control chamber within 5 min is recorded to verify whether the automatic pressure regulating valve 8 to be tested meets air tightness requirements;

S45: the leakage test: the control chamber and the air-in chamber of the automatic pressure regulating valve 8 to be tested are subjected to the leakage test sequentially:

S451: the leakage test of the control chamber: air is supplied by the air supply 1 to the pneumatic circuit, and then filtered through the pneumatic FRL unit 2 to obtain clean compressed air, an air supply pressure is regulated by the precision pressure reducing valve 5, and all shut-off valves are opened; air is supplied to the automatic pressure regulating valve 8 to be tested, and after a target pressure is reached and the pressure is stable, the second shut-off valve 10 and the eighth shut-off valve 26 are closed, such that the control chamber of the automatic pressure regulating valve 8 to be tested is in a closed state but can continue to supply air; and a flow signal of the second flow sensor 19 is acquired, which is a leakage of the control chamber of the automatic pressure regulating valve 8 to be tested; and S452: the leakage test of the air-in chamber: air is supplied by the air supply 1 to the pneumatic circuit, and then filtered through the pneumatic FRL unit 2 to obtain clean compressed air, an air supply pressure is regulated by the precision pressure reducing valve 5, and all shut-off valves are opened; air is supplied to the automatic pressure regulating valve 8 to be tested, and after a target pressure is reached and the pressure is stable, the first shut-off valve 9 and the fifth shut-off valve 17 are closed, such that a lower chamber of the automatic pressure regulating valve 8 to be tested is in a closed state but can continue to supply air; and a flow signal of the first flow sensor 12 is acquired, which is a leakage of the air-in chamber of the automatic pressure regulating valve 8 to be tested;

S46: the brake chamber braking force test: a test is conducted according to step S41, a force signal of the force sensor 23 is acquired, and braking force change data of the automatic pressure regulating valve 8 to be tested during a pressure regulating process are calculated and analyzed by a braking force calculation model of the host.

The above examples are only used to illustrate the design ideas and features of the present disclosure, such that those skilled in the art can understand and implement the content of the present disclosure accordingly; and the protection scope of the present disclosure is not limited to the above examples. Therefore, all equivalent changes or modifications made according to the principle and design idea disclosed in the present disclosure fall within the protection scope of the present disclosure.

What is claimed is:

1. A test device for an automatic pressure regulating valve of an electronic braking system (EBS), comprising: an air supply, a pneumatic circuit, a valve, a sensor, a silencer, a signal processing unit and a flow test circuit; wherein the air supply is configured to supply air to the pneumatic circuit;

the pneumatic circuit comprises a pneumatic trunk and an automatic pressure regulating valve test branch;

an air inlet of the pneumatic trunk is connected to an air outlet of the air supply for controlling an air pressure, controlling air supply, and regulating an air supply pressure;

the automatic pressure regulating valve test branch comprises a control air-in branch, a first air-in branch, a first air exhaust branch, an air-in branch, and an air-out branch; the control air-in branch, the first air-in branch, and the first air exhaust branch are configured to test air tightness of a control chamber of the automatic pressure regulating valve to be tested, and the air-in branch and the air-out branch are configured to test the air tightness of an air-in chamber of the automatic pressure regulating valve to be tested; an air inlet of the control air-in branch is connected to an air outlet of the pneumatic trunk, and an air outlet of the control air-in branch is connected to a control air inlet of the automatic pressure regulating valve to be tested; an air inlet of the first air-in branch is connected to the air outlet of the pneumatic trunk, and an air outlet of the first air-in branch is connected to a first air inlet of the automatic pressure regulating valve to be tested; an air inlet of the first air exhaust branch is connected to a first air exhaust port of the automatic pressure regulating valve to be tested; an air inlet of the air-in branch is connected to the air outlet of the pneumatic trunk, and an air outlet of the air-in branch is connected to an air inlet of the automatic pressure regulating valve to be tested; an air inlet of the air-out branch is connected to an air outlet of the automatic pressure regulating valve to be tested;

the valve comprises a first electro/pneumatic proportional valve, a second electro/pneumatic proportional valve, a first shut-off valve, a second shut-off valve, a third shut-off valve, a fourth shut-off valve, a fifth shut-off valve, a sixth shut-off valve, a seventh shut-off valve, an eighth shut-off valve, and a first air-in valve and a first air exhaust valve of the automatic pressure regulating valve to be tested; the first and second electro/pneumatic proportional valves are configured for intervened braking, and the shut-off valves are configured for pressure regulation; the first electro/pneumatic proportional valve is connected in series in the control air-in branch; the second electro/pneumatic proportional valve and the eighth shut-off valve are sequentially connected in series in the first air-in branch; one side of the second shut-off valve is connected to an air outlet of the first air exhaust branch, and another side of the second shut-off valve is connected to the silencer configured to reduce an air exhaust sound; the first shut-off valve is connected in series in the air-in branch; one side of the fifth shut-off valve is connected to an air outlet of the air-out branch; the first air-in valve and the first air exhaust valve are respectively arranged at the first air inlet and the first air exhaust port of the automatic pressure regulating valve to be tested;

the sensor comprises a first pressure sensor, a second pressure sensor, a first flow sensor and a second flow sensor; the first pressure sensor is arranged in the air-in chamber of the automatic pressure regulating valve to be tested, and the first pressure sensor is configured to measure an air pressure in the air-in chamber; the second pressure sensor is arranged at the air outlet of the automatic pressure regulating valve to be tested, and the second pressure sensor is configured to measure an air pressure at the air outlet of the automatic pressure regulating valve to be tested;

the signal processing unit comprises a data acquisition circuit, a filter circuit, and a relay; a signal input terminal of the filter circuit is connected to a signal output terminal of the sensor, a signal output terminal of the filter circuit is connected to an analog-to-digital conversion interface of the data acquisition circuit, and the filter circuit is configured to filter a signal input into the data acquisition circuit; a coil of the relay is connected to a digital-to-analog conversion interface of the data acquisition circuit, a contact of the relay is connected to a controlled terminal of the valve, and the relay is configured to regulate open/close or a ventilation volume of the valve according to a received signal; a signal transmit-receive terminal of the data acquisition circuit is connected to a signal transmit-receive terminal of an upper computer, and the data acquisition circuit is configured to send sensor data to the upper computer and receive a control signal of the upper computer;

the flow test circuit comprises a first air inlet flow test circuit and an air inlet flow test circuit;

the first air inlet flow test circuit is connected in parallel at two sides of the eighth shut-off valve, and is configured to measure a flow rate of the first air inlet of the automatic pressure regulating valve to be tested;

the air inlet flow test circuit is connected in parallel at two sides of the first shut-off valve, and is configured to measure a flow rate of the air inlet of the automatic pressure regulating valve to be tested;

the sixth shut-off valve, the second flow sensor, and the seventh shut-off valve are sequentially connected in series in the first air inlet flow test circuit; and the third shut-off valve, the first flow sensor, and the fourth shut-off valve are sequentially connected in series in the air inlet flow test circuit.

2. The test device according to claim 1, wherein the pneumatic trunk comprises a pneumatic filter, regulator, and lubricator (FRL) unit, an air storage tank, an on-off valve, and a pressure reducing valve that are sequentially connected in series; the pneumatic FRL unit is configured to filter out residues and moisture in air; the air storage tank is configured to store air and keep an air pressure constant during test; the on-off valve is a main air supply switch of the test device; and the pressure reducing valve is configured to control an air supply pressure of the pneumatic circuit.

3. The test device according to claim 1, further comprising a control unit, an input unit, and an output unit; wherein a signal transmit-receive terminal of the control unit is connected to a signal transmit-receive terminal of the signal processing unit, and the control unit is configured to receive and process sensor data and send a valve control signal; a signal output terminal of the input unit is connected to a signal input terminal of the control unit, and the input unit is configured to convert a user operation into a control signal and send the control signal to the control unit; and a signal output terminal of the control unit is connected to a signal input terminal of the output unit, and the output unit is configured to display data output by the control unit to a user.

4. The test device according to claim 1, further comprising a brake chamber; wherein the sensor further comprises a force sensor and a third pressure sensor; another side of the fifth shut-off valve is connected in series with the brake chamber and the third pressure sensor sequentially, and the force sensor is arranged on the brake chamber; and the third pressure sensor is configured to measure an air pressure in the brake chamber, and the force sensor is configured to measure a push rod force during an inflation process of the brake chamber.

5. The test device according to claim 4, further comprising a test bench, wherein the test bench comprises a bracket, an insulating operating desk, and a frame;
the bracket comprises an on-off valve bracket, a shut-off valve bracket, an electro/pneumatic proportional valve bracket, a brake chamber bracket, and a force sensor bracket, which are respectively configured to fix the on-off valve, the shut-off valve, the electro/pneumatic proportional valves, the brake chamber, and the force sensor on the insulating operating desk through fasteners, such that the pneumatic circuit is on a same plane;
the insulating operating desk comprises an insulating pad and a bench panel; the insulating pad is laid between the bracket and the bench panel; the bench panel is configured to fix the bracket and the automatic pressure regulating valve to be tested in the same plane; and
the frame is configured to support the insulating operating desk.

6. A test method based on the test device for an automatic pressure regulating valve of an EBS according to claim 5, comprising the following steps:
S1: assembly of the test device
arranging the frame under a bench panel;
laying an insulating pad on the bench panel to form an insulating operating desk;
fixing the on-off valve, the shut-off valves, the electro/pneumatic proportional valves, the brake chamber, the force sensor, and the automatic pressure regulating valve to be tested on the insulating operating desk through fasteners and the bracket;
sequentially connecting a pneumatic FRL unit, an air storage tank, the on-off valve, and a pressure reducing valve in series to form the pneumatic trunk;
connecting the air inlet of the pneumatic trunk to the air outlet of the air supply,
connecting the air inlet of the control air-in branch to the air outlet of the pneumatic trunk,
connecting the air outlet of the control air-in branch to the control air inlet of the automatic pressure regulating valve to be tested, and
connecting the first electro/pneumatic proportional valve in series in the control air-in branch;
connecting the air inlet of the first air-in branch to the air outlet of the pneumatic trunk,
connecting the air outlet of the first air-in branch to the first air inlet of the automatic pressure regulating valve to be tested, and
sequentially connecting the second electro/pneumatic proportional valve and the eighth shut-off valve in series in the first air-in branch;
connecting the air inlet of the first air exhaust branch to the first air exhaust port of the automatic pressure regulating valve to be tested,
connecting the air outlet of the first air exhaust branch to one side of the second shut-off valve, and
connecting the other side of the second shut-off valve to the silencer;
connecting the air inlet of the air-in branch to the air outlet of the pneumatic trunk,
connecting the air outlet of the air-in branch to the air inlet of the automatic pressure regulating valve to be tested, and
connecting the first shut-off valve in series in the air-in branch;
connecting the air inlet of the air-out branch to the air outlet of the automatic pressure regulating valve to be tested,
connecting the air outlet of the air-out branch to one side of the fifth shut-off valve, sequentially connecting the brake chamber and the third pressure sensor in series to the other side of the fifth shut-off valve, and
arranging the force sensor on the brake chamber;
arranging the first pressure sensor in the air-in chamber of the automatic pressure regulating valve to be tested;
arranging the second pressure sensor at the air outlet of the automatic pressure regulating valve to be tested;
sequentially connecting the sixth shut-off valve, the second flow sensor, and the seventh shut-off valve in series in the first air inlet flow test circuit, and connecting the first air inlet flow test circuit in parallel at two sides of the eighth shut-off valve;
sequentially connecting the third shut-off valve, the first flow sensor, and the fourth shut-off valve in series in the air inlet flow test circuit, and connecting the air inlet flow test circuit in parallel at two sides of the first shut-off valve;
connecting the signal input terminal of the filter circuit to the signal output terminal of each of the first pressure sensor, the second pressure sensor, the third pressure sensor, the first flow sensor, the second flow sensor, and the force sensor, and
connecting the signal output terminal of the filter circuit to the analog-to-digital conversion interface of the data acquisition circuit;
connecting the coil of the relay to the digital-to-analog conversion interface of the data acquisition circuit, and
connecting the contact of the relay to the controlled terminal of each of the first electro/pneumatic proportional valve, the second electro/pneumatic proportional valve, the first shut-off valve, the second shut-off valve, the third shut-off valve, the fourth shut-off valve, the fifth shut-off valve, the sixth shut-off valve, the seventh shut-off valve, the eighth shut-off valve, and the first air-in valve and the first air exhaust valve of the automatic pressure regulating valve to be tested;
connecting the signal transmit-receive terminal of the data acquisition circuit to the signal transmit-receive terminal of the control unit;
connecting the signal output terminal of the input unit to the signal input terminal of the control unit;
connecting the signal output terminal of the control unit to the signal input terminal of the output unit;
S2: draining condensated water everywhere, closing all shut-off valves to make an output pressure everywhere in the test device zero, and closing a throttle valve of the lubricator;
S3: starting the test device, and inputting control parameters into the control unit through the input unit, such that the control unit sends the control parameters to each component of the pneumatic circuit through the signal processing unit; and
S4: allowing each component of the pneumatic circuit to run according to the received control parameters, such that the automatic pressure regulating valve to be tested is subjected to a functional test, a static performance test, a dynamic performance test, an air tightness test, a leakage test, and a brake chamber braking force test sequentially;

wherein step S4 specifically comprises:

S41: the functional test: supplying air by the air supply to the pneumatic circuit, filtering the air through the pneumatic FRL unit to obtain clean compressed air, regulating an air supply pressure by the pressure reducing valve, opening all shut-off valves, and conducting an electronic failed brake test, an electronic brake test, and a coupled brake test sequentially;

S42: the static performance test: setting a target pressure by the control unit, testing according to step S41, and acquiring a pressure value of the first pressure sensor;

S43: the dynamic performance test: continuously changing the target pressure by the control unit, testing according to step S41, and acquiring a pressure value of the first pressure sensor;

S44: the air tightness test: supplying air by the air supply to the pneumatic circuit, filtering the air through the pneumatic FRL unit to obtain clean compressed air, and regulating an air supply pressure by the pressure reducing valve; opening the first shut-off valve, and supplying air to the automatic pressure regulating valve to be tested; after a target pressure is reached, keeping the pressure constant for 1 min and closing the control air inlet, the first air inlet, the first air exhaust port, the air inlet, and the air outlet of the automatic pressure regulating valve to be tested; and recording a pressure drop between the air outlet of the automatic pressure regulating valve to be tested and the control chamber within 5 min;

S45: the leakage test: subjecting the control chamber and the air-in chamber of the automatic pressure regulating valve to be tested to the leakage test sequentially; and S46: the brake chamber braking force test: testing according to step S41, acquiring a force signal of the force sensor, and calculating and analyzing braking force change data of the automatic pressure regulating valve to be tested during a pressure regulating process;

wherein step S41 specifically comprises:

S411: the electronic failed brake test: sending a control signal by the control unit only to the first electro/pneumatic proportional valve, such that the first electro/pneumatic proportional valve regulates an outlet pressure of the automatic pressure regulating valve to be tested; and ventilating the control air inlet of the automatic pressure regulating valve to be tested, and acquiring pressure values of the first pressure sensor, the second pressure sensor, and the third pressure sensor by the control unit;

S412: the electronic brake test: sending a control signal only to the second electro/pneumatic proportional valve by the control unit, and ventilating the first air inlet of the automatic pressure regulating valve to be tested; and regulating an outlet pressure of the automatic pressure regulating valve to be tested by the first air-in valve and the first air exhaust valve of the automatic pressure regulating valve to be tested according to the control signal sent by the control unit, and acquiring pressure values of the first pressure sensor, the second pressure sensor, and the third pressure sensor by the control unit; and S413: the coupled brake test: sending a control signal to both the first electro/pneumatic proportional valve and the second electro/pneumatic proportional valve by the control unit, such that the first electro/pneumatic proportional valve to ventilate the control air inlet and the first air inlet of the automatic pressure regulating valve to be tested; and regulating an outlet pressure of the automatic pressure regulating valve to be tested by the first air-in valve and the first air exhaust valve of the automatic pressure regulating valve to be tested according to the control signal sent by the control unit, and acquiring pressure values of the first pressure sensor, the second pressure sensor, and the third pressure sensor by the control unit wherein step S45 specifically comprises:

S451: the leakage test of the control chamber: supplying air by the air supply to the pneumatic circuit, filtering the air through the pneumatic FRL unit to obtain clean compressed air, regulating an air supply pressure by the pressure reducing valve, and opening all shut-off valves; supplying air to the automatic pressure regulating valve to be tested, and after a target pressure is reached and the pressure is constant, closing the second shut-off valve and the eighth shut-off valve, such that the control chamber of the automatic pressure regulating valve to be tested is in a closed state but can continue to supply air; and acquiring a flow signal of the second flow sensor, which is a leakage of the control chamber of the automatic pressure regulating valve to be tested; and S452: the leakage test of the air-in chamber: supplying air by the air supply to the pneumatic circuit, filtering the air through the pneumatic FRL unit to obtain clean compressed air, regulating an air supply pressure by the pressure reducing valve, and opening all shut-off valves; supplying air to the automatic pressure regulating valve to be tested, and after a target pressure is reached and the pressure is constant, closing the first shut-off valve and the fifth shut-off valve, such that a lower chamber of the automatic pressure regulating valve to be tested is in a closed state but can continue to supply air; and acquiring a flow signal of the first flow sensor, which is a leakage of the air-in chamber of the automatic pressure regulating valve to be tested.

\* \* \* \* \*